United States Patent
Schweid et al.

(10) Patent No.: US 9,955,041 B2
(45) Date of Patent: Apr. 24, 2018

(54) SYSTEM AND METHOD FOR TONE REPRODUCTION CURVE COLOR RESOLUTION ENHANCEMENT IN A THREE-DIMENSIONAL OBJECT PRINTER

(71) Applicant: Xerox Corporation, Norwalk, CT (US)

(72) Inventors: Stuart A. Schweid, Pittsford, NY (US); Martin L. Frachioni, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 398 days.

(21) Appl. No.: 14/737,787

(22) Filed: Jun. 12, 2015

(65) Prior Publication Data

US 2016/0366301 A1 Dec. 15, 2016

(51) Int. Cl.
| | | |
|---|---|---|
| *H04N 1/405* | (2006.01) | |
| *H04N 1/407* | (2006.01) | |
| *H04N 1/034* | (2006.01) | |
| *G06K 15/02* | (2006.01) | |
| *G06K 15/10* | (2006.01) | |
| *B41J 3/407* | (2006.01) | |
| *B41J 2/205* | (2006.01) | |
| *B29C 67/00* | (2017.01) | |
| *H04N 1/52* | (2006.01) | |
| *H04N 1/60* | (2006.01) | |

(Continued)

(52) U.S. Cl.
CPC ....... *H04N 1/4055* (2013.01); *B29C 67/0088* (2013.01); *B41J 2/2054* (2013.01); *B41J 3/4073* (2013.01); *G06K 15/102* (2013.01); *G06K 15/1881* (2013.01); *H04N 1/034* (2013.01); *H04N 1/4072* (2013.01); *B29C 67/0007* (2013.01); *B33Y 50/00* (2014.12); *B41J 2/2121* (2013.01); *G06K 15/1878* (2013.01); *H04N 1/52* (2013.01); *H04N 1/6002* (2013.01); *H04N 1/6027* (2013.01)

(58) Field of Classification Search
None
See application file for complete search history.

(56) References Cited

U.S. PATENT DOCUMENTS

| | | |
|---|---|---|
| 5,347,374 A | 9/1994 | Fuss et al. |
| 5,598,204 A | 1/1997 | Harrington |
| 5,777,656 A | 7/1998 | Henderson |

(Continued)

OTHER PUBLICATIONS

Qiu et al.; An Optimal Tone Reproduction Curve Operator for the Display of High Dynamic Range Images; School of Computer Science, The University of Nottingham; 2005; 4 Pages; Nottingham, UK.

*Primary Examiner* — Scott A Rogers (74) *Attorney, Agent, or Firm* — Maginot, Moore & Beck LLP (57) ABSTRACT

A method of operating a three-dimensional object printer to form printed images on a surface of an object with increased color resolution includes generating a plurality of low-precision tone reproduction curves (TRCs) from a plurality of high-precision color conversion entries that are modified by a plurality of values in a one-to-one correspondence to the TRCs. The method further comprises generating modified contone image and halftone image data for each plane using one of the low-precision TRCs and forming the image from multiple printed layers of ink corresponding to the plurality of planes.

20 Claims, 7 Drawing Sheets

(51) Int. Cl.
  *B41J 2/21* (2006.01)
  *B33Y 50/00* (2015.01)

(56) References Cited

U.S. PATENT DOCUMENTS

| | | |
|---|---|---|
| 5,847,724 A | 12/1998 | Mantell |
| 5,963,244 A | 10/1999 | Mestha et al. |
| 5,975,671 A | 11/1999 | Spaulding et al. |
| 6,697,582 B1 | 2/2004 | Scheuer |
| 6,806,980 B2 | 10/2004 | Xu et al. |
| 7,023,578 B2 | 4/2006 | Hayes et al. |
| 7,274,492 B1 * | 9/2007 | Hains .................... H04N 1/405 358/1.9 |
| 7,440,139 B2 | 10/2008 | Loce et al. |
| 7,589,868 B2 * | 9/2009 | Velde ........................ B41C 1/00 358/1.9 |
| 7,597,418 B2 | 10/2009 | Mantell et al. |
| 7,800,779 B2 | 9/2010 | Fan et al. |
| 7,880,930 B2 | 2/2011 | Zhang et al. |
| 8,118,391 B2 | 2/2012 | Snyder et al. |
| 8,437,040 B2 | 5/2013 | Taylor et al. |
| 8,699,103 B2 | 4/2014 | Mestha et al. |
| 8,960,839 B1 | 2/2015 | Mantell et al. |
| 8,995,022 B1 * | 3/2015 | Vronsky ............. H01L 51/0005 257/40 |
| 9,019,561 B1 | 4/2015 | Sanchez et al. |
| 9,286,554 B1 * | 3/2016 | Maltz .................... B33Y 10/00 |
| 9,446,556 B2 * | 9/2016 | Hosier ................ B29C 67/0059 |
| 2004/0165199 A1 | 8/2004 | Klassen et al. |
| 2006/0098251 A1 | 5/2006 | Eklund et al. |
| 2006/0152764 A1 | 7/2006 | Loce et al. |
| 2006/0285134 A1 | 12/2006 | Viturro et al. |
| 2017/0041479 A1 * | 2/2017 | Kubo ..................... B33Y 10/00 |

\* cited by examiner

SYSTEM AND METHOD FOR TONE REPRODUCTION CURVE COLOR RESOLUTION ENHANCEMENT IN A THREE-DIMENSIONAL OBJECT PRINTER

TECHNICAL FIELD

The system and method disclosed in this document relates to printing systems generally, and, more particularly, to systems and methods for adjusting tone reproduction curves in printers.

BACKGROUND

Halftone printers emit a combination of colorants to form both single color and multicolor printed images using a comparatively small number of primary colors. Inkjet printers and three-dimensional object inkjet printers eject patterns of ink drops to form both single and multicolor printed images. In a three-dimensional object inkjet printer, one or more printheads eject drops of ink onto a surface of an object that is formed from a build material. In many embodiments, the printer forms the printed image in a multi-pass printing process where the inkjets in the printheads apply multiple layers of ink to the form the printed image on the surface of the object. The printer applies multiple layers of ink using a single halftone pattern of ink drops to build up a sufficient amount of ink for the printed image to be clearly visible on the surface of the object. Combinations of multiple ink colors, such as cyan, magenta, yellow, and black (CMYK) inks, form images with a wide range of perceptible colors on the surface of the object.

Many modern inkjet printers receive digital data corresponding to a printed image. The digital data for a printed image often include data corresponding to printed colors that are encoded in a continuous tone (contone) format. In a contone format, a single two-dimensional location in the image, which is referred to as a contone pixel, can have a wide range of colors that are formed from different intensity levels of basic colors such as red, green, blue (RGB) colors. In other embodiments, the colors of contone pixels are encoded in a device independent color space such as the L*a*b* color space or other color spaces known to the art. Halftone printers, however, produce images from patterns of colorants using the limited number of ink or toner colors in a halftone output that includes a pattern of the colorant, such as a pattern of ink drops or toner. For example, the color of a single pixel of contone image data may be reproduced using a pattern of multiple separate ink drops that reproduce the contone color on a physical print medium. The physical properties of the ink drops affect the perceptible intensity of printed ink colors since the ink drops spread on the image receiving surface and generally have circular shapes instead of the square shapes associated with contone pixels.

Three-dimensional inkjet printers employ tone reproduction curves (TRCs) to convert image data that are provided in the contone formats to values such that when the values are halftoned, the printed ink patterns provide an accurate reproductions of the original contone images. For example, a set of gray contone pixels with a relative level of 50% between pure-black (100% level) and pure-white (0% level) generates a halftone pattern with half of the pixels being assigned a black ink drop and the other half of the pixels being left blank, which corresponds to a background material under the printed image. In some instances the background material has a white or light gray color to provide a neutral background for a printed image. Because the ink drops spread on the surface of the object, however, printing the direct halftone pattern produces a printed image that is darker than the intended 50% level in one printer configuration. A digital controller in the printer uses the TRC to generate modified contone image data that includes adjustments for the intensity levels of some or all of the contone pixels in the original digital image data. For example, in one configuration a TRC reduces a contone pixel levels from 50% to 40%. The printer then uses halftone processes that are known to the art to convert the modified contone image data into patterns of image data corresponding to printed colorant patterns in a printed image.

In modern printing systems, the TRCs are typically embodied as digital data structures that have a predetermined number of potential input and output values based on the number of discrete levels that can be represented using digital data. For example, an 8-bit TRC generates a single component value in a range of 0-255 ($2^8$). Since the number of perceptible color levels in a printed image is often much greater than the number of discrete levels represented in a TRC, modern printers often employ complex techniques such as spatial adjustments to halftone pixels to produce an apparent increase in the color resolution of printed images. In a spatial adjustment process, a digital processor in a printer introduces randomized errors into halftoned image data based on the location of pixels in a two-dimensional image to increase the apparent number of color levels in the image. Of course, another solution is to increase the number of digital bits used in the TRCs (e.g. 12 or 16 bits) to increase color resolution, but such changes require both extensive hardware and software modifications to printers and image processing software to produce an entire image process pipeline with the increase resolution, which is often impractical. Consequently, improved systems and methods for controlling halftone printing, including halftone printed images in three-dimensional object printers to increase the effective color resolution of printed images would be beneficial.

SUMMARY

In one embodiment, a method of operating a three-dimensional object printer to form printed images on a surface of a three-dimensional printed object has been developed. The method includes generating with a controller a first tone reproduction curve (TRC) having a first plurality of entries with a first precision, the first plurality of entries being generated with reference to a second plurality of entries having a second precision, the second plurality of entries being modified by a first value generated within a predetermined range prior to being used to generate the first plurality of entries, the second precision being greater than the first precision and generating with the controller a second TRC having a third plurality of entries with the first precision, the third plurality of entries being generated with reference to the second plurality of entries being modified by a second value generated within the predetermined range prior to being used to generate the third plurality of entries, the second value being different than the first value. The method further includes receiving with the controller input contone image data corresponding to an image to be printed by the printer, generating with the controller first contone image data for a first plane of a multi-layer printed image with reference to the input contone image data and the first TRC, generating with the controller first halftone image data with reference to the first contone image data and a predetermined halftone process, operating with the controller a plurality of inkjets to form a first layer of the multi-layer printed image on a surface of a three-dimensional printed object with reference to the first halftone image data, generating with the controller second contone image data for a second plane of the three-dimensional printed image with reference to the input contone image data and the second TRC, generating with the controller second halftone image data with reference to the second contone image data and the predetermined halftone process, the second halftone image data being different than the first halftone image data, and operating with the controller the plurality of inkjets to form a second layer of the multi-layer printed image on the first layer with reference to the second halftone image data.

In another embodiment, a three-dimensional object printer that is configured to form printed images on a surface of a three-dimensional printed object has been developed. The printer includes a plurality of inkjets configured to eject ink onto a surface of a three-dimensional printed object in a print zone, a memory, and a controller operatively connected to the plurality of inkjets and the memory. The controller is configured to generate a first tone reproduction curve (TRC) having a first plurality of entries with a first precision, the first plurality of entries being generated with reference to a second plurality of entries having a second precision stored in the memory, the controller modifying the second plurality of entries by a first value generated within a predetermined range prior to being used to generate the first plurality of entries, the second precision being greater than the first precision and generate a second TRC having a third plurality of entries with the first precision, the third plurality of entries being generated with reference to the second plurality of entries, the controller modifying the second plurality of entries by a second value generated within the predetermined range prior to being used to generate the third plurality of entries, the second value being different than the first value. The controller is further configured to receive input contone image data corresponding to an image to be printed by the printer, generate first contone image data for a first plane of a multi-layer printed image with reference to the input contone image data and the first TRC, generate first halftone image data with reference to the first contone image data and a predetermined halftone process, operate the plurality of inkjets to form a first layer of the multi-layer printed image on the surface of the three-dimensional printed object with reference to the first halftone image data, generate second contone image data for a second plane of the three-dimensional printed image with reference to the input contone image data and the second TRC, generate second halftone image data with reference to the second contone image data and the predetermined halftone process, the second halftone image data being different than the first halftone image data, and operate the plurality of inkjets to form a second layer of the multi-layer printed image on the first layer with reference to the second halftone image data.

BRIEF DESCRIPTION OF THE DRAWINGS

An embodiment of this application is described, by way of example, with reference to the accompanying drawings, in which like reference numerals refer to like elements, and in which.

DETAILED DESCRIPTION

For a general understanding of the environment for the system and method disclosed herein as well as the details for the system and method, reference is made to the drawings. In the drawings, like reference numerals have been used throughout to designate like elements. As used herein, the word "printer" encompasses an imaging device that forms patterns of a colorant material, such as ink, on a surface of a three-dimensional printed object. Common printer embodiments include inkjet printers, which eject drops of a marking material onto the surface of the object. As used herein, the term "process direction" refers to a direction of movement of an image receiving surface, such as a surface of the three-dimensional printed object along a media path through a printer. A media transport in the printer uses one or more actuators, such as electric motors, to move the print medium past one or more printheads in the print zone to receive ink images and passes other printer components, such as heaters, fusers, pressure rollers, and on-sheet optical imaging sensors, that are arranged along the media path. As used herein, the term "cross-process" direction refers to an axis that is perpendicular to the process direction along the image receiving surface.

As used herein, the term "z-axis" refers to an axis that is perpendicular to the process direction, the cross-process direction, and to the plane of the support member in a three-dimensional object printer. At the beginning of the three-dimensional object printing process, a separation along the z-axis refers to a distance of separation between the support member and the printheads that form the layers of build material and ink formed on the object. As the inkjets in the printheads form each layer of build material, the printer adjusts the z-axis separation between the printheads and the uppermost layer to maintain a substantially constant distance between the printheads and the uppermost layer of the object during the printing operation. In some embodiments, the support member moves away from the printheads during the printing operation to maintain the z-axis separation, while in other embodiments the printheads move away from the partially printed object and support member to maintain the z-axis separation.

As used herein, the term "contone level" refers to a value, set of values, or coordinates that are assigned to a pixel of contone image data that indicates the intensity of the pixel in either a device independent color space, such as L*a*b*, or in a device dependent color space such as a CMYK color space in a printer. In one embodiment, the contone values are expressed as percentages or numeric values for each color component that forms the contone value, while in another embodiment the contone levels is expressed with a predetermined numeric scale such as a scale of 0 to 255 in an 8-bit embodiment.

As used herein, the term "tone reproduction curve" (TRC) refers to a data structure that is stored in a memory of a printer to enable the printer to translate an input contone image datum to an output contone image datum that is adjusted to reflect the physical characteristics of the printer for accurate color reproduction in a physical printed document. In one embodiment, the TRC is embodied at a lookup table (LUT) that is stored in the memory using a suitable data structure, such as a one-dimensional array. Each entry in the LUT corresponds to one point in the tone reproduction curve that maps the input contone datum value in the device independent color space to an output contone datum value in the device dependent color space for the printer. The numeric value of the input contone level value is an index that corresponds to one entry in the LUT, and the numeric value of the LUT entry corresponds to an output contone level value in a device-specific color space for the printer. Many printers use multiple TRCs both for different color separations in color printers and in multiple color separations within each ink color that the printer uses to form printed images. For example, a cyan, magenta, yellow, black (CMYK) color printer uses at least one TRC for each of the CMYK colors.

As used herein, the term "precision" refers to a configuration of a digital processing device, such as a digital controller, digital data storage device, or other suitable digital logic device, to store numeric data over a predetermined range with a finite number of distinct values. For example, as is well known in mathematics, there are an infinite number of real numbers between any two distinct values such as 0.0 and 1.0. Similarly, there are an infinite total number of integers although there are a finite number of integers between two distinct integer values. However, practical digital computing systems cannot represent an infinite number of values. Instead, the digital computing systems store data in a binary format with a precision level that is referred to as a "bit depth" or as a number of bits of precision. The bit-depth refers to the total number of binary bits (each bit is "0" or "1") that the digital computing device uses to represent a numeric value. The numeric value can be represented as a floating point number (e.g. 1.5) or as an integer (e.g. 2). The total number of distinct values that a numeric representation at a given precision can represent is typically $2^n$ where n is the number of bits. Common precision levels found in digital printing systems include, but are not limited to, 8-bit, 10-bit, 12-bit, 16-bit, and 32-bit representations. The precision increases with the number of bits, so values with greater precision in a digital computing system have a correspondingly higher bit depth, while values with lesser precision have a lower bit depth.

As used herein, the term "color resolution" refers to a number of distinct color levels that a TRC is capable of translating. For example, many existing printers represent individual color components with 8-bit precision, which are represented as integer numbers (0 to 255). In some configurations, a 0 value indicates a minimum level of the color component and a 255 value. A color printer uses multiple levels of the contone component level for each pixel in contone image data in combination with multiple color separations (such as CMYK) to enable the printer to reproduce a large number of colors at varying intensity levels. While 8-bit per separation color resolution is a common color resolution used in many printers, some printer embodiments have a lower (e.g. 6-bit) or higher (e.g. 12-bit) inherent color resolution level. Of course, physical objects exhibit colors with a far higher number of gradations than the limited precision for the numeric representations of different levels than are encoded in the digital image data. As described in more detail below, a printer modifies TRCs to increase the effective color resolution for contone image data without requiring modifications to hardware in the printer to increase the inherent precision of numeric values in TRCs and other data structures and hardware components within the printer. The term "effective color resolution" refers to a color resolution that a printer produces with a greater number of distinct levels than the default number that is inherent to the precision of the TRCs in the printer.

As used herein, the term "plane" refers to a two-dimensional arrangement of image data that corresponds to a single printed pattern for a single layer of a multi-layer printed image. As used herein, the term "layer" as used in reference to a printed image refers to the arrangement of ink drops that the printer ejects to form a printed pattern corresponding to a plane. The term plane refers to both two-dimensional contone image data and two-dimensional halftone image data. In a multi-plane printing operation, a printer receives a single set of image data corresponding to one image and generates multiple planes of image data corresponding to each pass in a plurality of passes to form one layer of the printed image on an image receiving surface. As described below, the printer generates modified TRCs for different planes in a multi-layer printing process to enable the printer to form printed images with a higher effective color resolution than the inherent precision of the individual TRCs.

Figure 6:
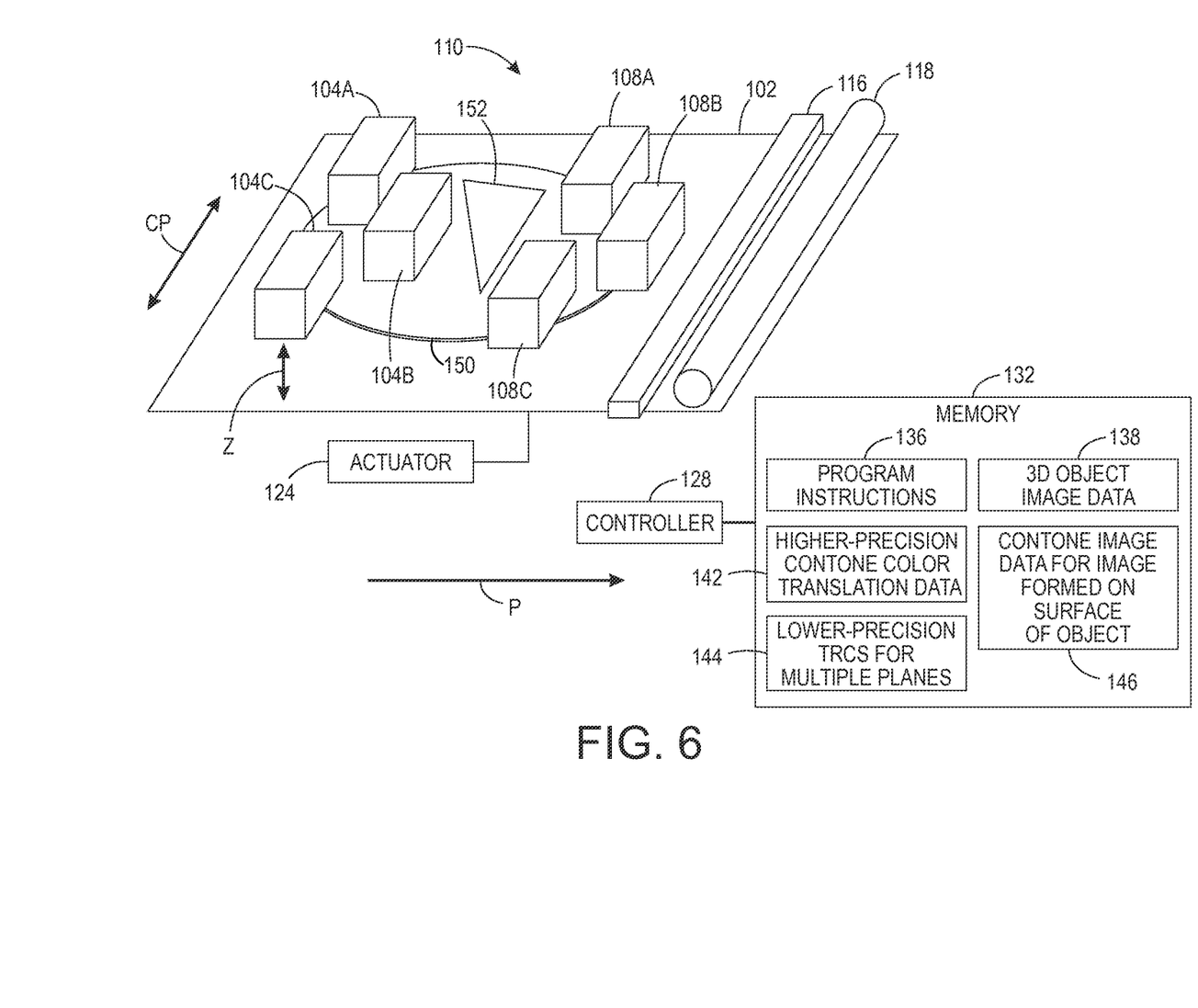
FIG. 6 is a schematic diagram of a three-dimensional object printer.

FIG. 6 is a simplified schematic view of a three-dimensional object printer 100 that is configured to identify the z-axis distance between one or more printheads and a substrate in the printer 100. The printer 100 includes a support member 102, a first printhead array including printheads 104A-104C, a second printhead array including printheads 108A-108C, a support member actuator 124, an optical sensor 116, a leveler 118, a controller 128, and a memory 132. In one configuration, the printhead arrays 104A-104C emit drops of a build material that forms a three-dimensional printed object on the support member 102. In FIG. 6, the object 150 is an example of a three-dimensional printed object, and FIG. 6 depicts a printed image 152 that the printer 100 forms on a surface of the object 150. The printheads 108A-108C include inkjets that eject drops of ink onto one or more surfaces of the object 150 to form the printed image 152 and other printed images. In the embodiment of FIG. 6, the printheads 108A-108C emit drops of cyan, magenta, yellow, and black (CMYK) inks, although alternative configurations use different ink colors. FIG. 6 depicts a single array of color ink printheads 108A-108C for illustrative purposes, but alternative embodiments include multiple printhead arrays for color inks and optionally include a single array of printheads for each of the CMYK ink colors.

In the printer 100, the support member 102 is a planar member, such as a metal plate, that moves in a process direction P. The printhead arrays 104A-104C and 108A-

108C, optical sensor 116, and leveler 118 form a print zone 110. The support member 102 carries any previously formed layers of the build material through the print zone 110 in the process direction P. During the printing operation, the support member 102 moves in a predetermined process direction path P that passes the printheads multiple times to form successive layers of the three-dimensional printed object 150 and the image 152. The leveler 118 is a roller or other suitable member that engages an upper layer of the printed object 150 and optionally the image 152. The leveler 118 applies pressure and optionally heat to the uppermost layer of material to smooth the material prior to application of additional build material or ink in a subsequent pass through the print zone 110. In some embodiments, multiple members similar to the member 102 pass the print zone 110 in a carousel or similar configuration. In the printer 100, one or more actuators move the member 102 through the print zone 110 in the process direction P.

In the printer 100, an actuator 124 also moves the support member 102 along the z-direction axis (z) away from the printheads in the print zone 110 after application of each layer of material to the support member. In another configuration, a different set of actuators move the printhead arrays 104A-104C and 108A-108C, respectively, upwards along the z-axis to maintain the separation between the printheads and a printed object. In the printer 100, the actuator 124 is an electromechanical actuator such as a stepper motor that receives control signals from the controller 128 to move the support member 102 by predetermined distances along the z-axis. The print zone 110 forms an additional layer to the three-dimensional printed object or objects on each member during each circuit through the path to form multiple sets of three-dimensional objects in parallel.

The printhead arrays including the printheads 104A-104C and 108A-108C that eject material toward the support member 102 to form layers of a three-dimensional printed object, such as the object 150 that is depicted in FIG. 1B. Each of the printheads 104A-104C and 108A-108C includes a plurality of inkjets that eject liquefied drops of a build material. In one embodiment, each inkjet includes a fluid pressure chamber that receives the liquid build material, an actuator such as a piezoelectric actuator, and an outlet nozzle. The piezoelectric actuator deforms in response to an electric firing signal and urges the liquefied build material through the nozzle to eject a drop of the build material toward the member 102. If the member 102 bears previously formed layers of a three-dimensional object, then the ejected drops of the build material form an additional layer of the object. Each of the printheads 104A-104C and 108A-108C includes a two-dimensional array of the inkjets, with an exemplary printhead embodiment including 880 inkjets. During operation, the controller 128 controls the generation of the electrical firing signals to operate selected inkjets at different times to form each layer of the build material for the object. As described in more detail below, the controller 128 also generates firing signals for the inkjets in the printheads 104A-104C and 108A-108C to print test patterns that the printer 100 uses to identify a distance along the z-axis between each printhead and a substrate in the print zone 110. The substrate can be the surface of the support member 102 or an upper layer of a three-dimensional printed substrate formed on the support member 102.

While FIG. 1A and FIG. 1B depict two printhead arrays that eject drops of the build material, alternative embodiments can include three or more printhead arrays that form printed objects with additional build materials. Another embodiment includes only a single printhead array. While the printhead arrays 104A-104C, 108A-108C are each depicted as including three printheads, alternative configurations can include few printheads or a greater number of printheads to accommodate print zones with different sizes in the cross-process direction. Additionally, in rasterized three-dimensional object printer embodiments, one or more printheads move along the cross-process direction axis CP and optionally the process direction axis P during printing operations.

The optical sensor 116 includes an array of photodetectors that is arranged across the print zone 110 in the cross-process direction CP is configured to generate digitized image data that corresponds to light reflected from the build material that is formed on the member 102. In one embodiment, the photodetectors generate gray scale 8-bit image data with a total of 256 (0 to 255) levels that correspond to a level of reflected light that each photodetector receiver from the top-most layer of printed build material or printed ink on the surface of the object 150. In other embodiments, the optical sensor 116 incorporates multispectral photodetector elements such as red, green, blue (RGB) sensor elements. During operation, the optical sensor 116 generates multiple image scanlines that correspond to printed patterns of material drops including printed test patterns formed on the support member 102 or on a substrate that is formed from layers of build material. As the support member 102 moves past the image sensor 116, the optical sensor 116 generates two-dimensional generated image data from a series of the scanlines. The controller 128 receives the generated image data and performs further processing of the generated image data to identify the z-axis direction distances between the printheads and the substrate with reference to generated image data of printed test patterns.

The controller 128 is a digital logic device such as a microprocessor, microcontroller, field programmable gate array (FPGA), application specific integrated circuit (ASIC) or any other digital logic that is configured to operate the printer 100. In the printer 100, the controller 128 is operatively connected to the actuator 124 that controls the movement of the support member 102 and the actuators 120A and 120B that control the z-axis movement of the printhead arrays 104A-104C and 108A-108C. The controller 128 is also operatively connected to the printhead arrays 104A-104C and 108A-108C, the optical sensor 116, and a memory 132.

During operation, the controller 128 executes stored program instructions and accesses data required to perform the programmed functions in a memory 132 that is operatively connected to the controller 128. The memory 132 includes volatile data storage devices such as random access memory (RAM) and non-volatile data storage devices including magnetic and optical disks or solid state storage devices. The processors, their memories, and interface circuitry configure the controllers and/or print engine to perform the functions, such as the difference minimization function, described above. These components are provided on a printed circuit card or provided as a circuit in an application specific integrated circuit (ASIC). In one embodiment, each of the circuits is implemented with a separate processor device. Alternatively, the circuits can be implemented with discrete components or circuits provided in VLSI circuits. Also, the circuits described herein can be implemented with a combination of processors, ASICs, discrete components, or VLSI circuits.

The controller 128 executes stored program instructions 136 in the memory 132 to adjust the entries in TRCs that are stored in the memory 132 to enable the printer 100 to form printed images at a higher effective color resolution than the inherent resolution level of the TRCs. The memory 132 stores the programmed instructions 136, three-dimensional object image data 138, input contone image data 146 that correspond to one or more images that the printer 100 reproduces on the surface of an object, the high-precision color conversion data 142, and a modified plurality of lower resolution TRCs 144 that correspond to multiple planes.

In the printer 100, the high precision color conversion data 142 include one or more one-dimensional LUTs corresponding to one or more planes in the multi-layer printed image. For each plane, the memory 132 stores a separate TRC for each color separation, such as CMYK colors, that the printer 100 uses to form halftone printed images. The entries in each LUT include higher-precision floating point or integer values that convert input contone image data from a device independent color space to a device-dependent color space for the printer 100. In some instances the higher precision entries 142 are also a TRC and in other embodiments the higher precision entries 142 are part of an international color consortium (ICC) color profile or other suitable color profile. The higher precision values 142 have a higher color resolution than is available in a corresponding lower precision TRC, but the higher precision values cannot be used directly during the halftone printing process. In the illustrative embodiment of FIG. 6, each of the higher precision entries 142 is a 16-bit floating point value.

As described in more detail below, the controller 128 uses the higher precision color conversion entries 142 as an input to a modified TRC generation process to produce lower precision TRCs 144 that have an averaged increased effective color resolution across multiple planes even though each of the TRCs 144 has a lower precision and color resolution individually. Each of the TRCs 144 corresponds to one plane for one of the CMYK color separations, and is embodied as another LUT that includes a lower precision output contone value in the device-dependent color space for each entry in the LUT. In the embodiment of FIG. 6, the TRCs 144 store 8-bit integer values. The controller 128 generates each LUT for the TRCs 144 by adding a single floating point value to each entry in one of the higher precision entries 142 and applying a floor function to preserve only the integer component of each floating point LUT entry. In one configuration, the controller 128 generates each LUT in for the TRCs 144 dynamically using a random value for the TRC of each plane prior to commencing a printing operation when the number of planes used during the printing operation is not indicated in the parameters of the print job. In another embodiment, the controller 128 generates a predetermined set of LUTs using numeric values that are distributed at uniform intervals over a predetermined range when the controller 128 has a priori data that specify the number of planes used in a print job prior to commencement of the print job.

During a printing operation, the controller 128 uses the LUTs in the TRCs 144 to form printed images with an effectively higher color resolution for a plurality of planes in a multi-layer printed image than is inherently present in the default structure of each TRC for a single plane. For example, as described below, in some embodiments each TRC is a one-dimensional LUT with 8 bits of color resolution corresponding to 256 entries for 8-bit input data with each entry stored in the LUT holding an 8-bit integer value (0-256). During operation, the controller 128 receives an input contone image datum corresponding to a contone color value for a pixel in one plane during a print job. The contone input datum is also an 8-bit integer value in the embodiment of the printer 100. The controller 128 uses the value of the contone input datum to identify an index in the LUT and uses the value of the entry at the identified index as an output contone datum. The controller 128 continues the print job using the output contone datum as an input to a halftone process that the printer 1000 uses to generate halftoned binary image date of the printed image. The binary image data include a two-dimensional array of pixels for one or more color separations (e.g. CMYK in the printer 100) that correspond to the locations where ink drops from inkjets in the print zone 20 are arranged to form a physical reproduction of the original input contone image data. The controller 128 then controls the operation of one or more inkjets in the printheads of the printheads 108A-108C with reference to the halftoned binary image data to form a printed image on the surface of the object 150.

Figure 1:
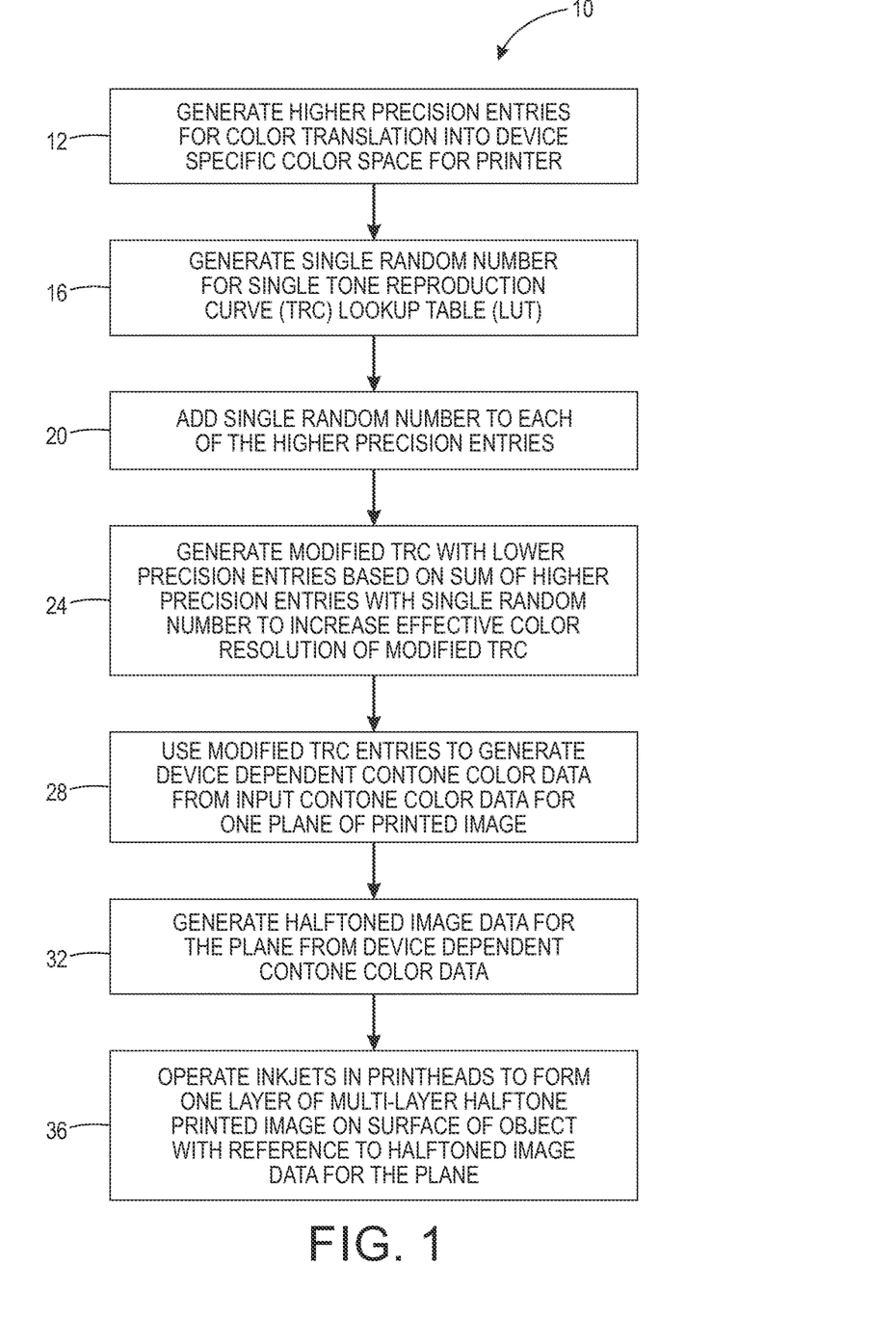
FIG. 1 is a block diagram of a process for generating modified tone reproduction curves (TRCs) for planes in a multi-plane printing process to increase the effective color resolution of a multi-layer printed image.

FIG. 1 depicts a process 10 for the operation of a printer, such as the printer 100 in FIG. 6 with an increased effective color resolution. In the discussion below a reference to the process 10 performing a function or action refers to the operation of a digital controller that executes stored program instructions to perform the function or action in association with one or more components in a printer. The process 10 is described in conjunction with the printer 100 of FIG. 6 for illustrative purposes. The three-dimensional object printer 100 performs the process 10 after the controller 128 operates the printheads 104A-104C to eject drops of a build material to form at least a portion of the three-dimensional printed object 150 on the support member 102. The controller 128 receives three-dimensional object data 138 from the memory 132 and produces the object 150 with a size and shape specified in the three-dimensional object data 138.

Process 10 begins as the printer 100 generates a LUT for a TRC where the LUT includes floating point entries in one plane (block 12). In the illustrative example of FIG. 6, the controller 128 generates an 8-bit LUT with 256 entries for the plane. The controller 128 retrieves high precision entries for color translation data 142 from the memory 132 to populate each entry in a LUT with high-precision values, such as 16-bit floating point values in one embodiment of the process 10.

In one configuration, the higher precision color translation data 142 are stored in the memory 132 at the time of manufacture of the printer 100. For example, the color translation data 142 include International Color Consortium (ICC) profile data for the device specific color space of the printer 100 in one embodiment. In another embodiment, the printer 100 generates the higher precision color correction entries 142 by printing a series of test patches using one color of inkjets. The printer 100 produces printed patches with different densities of printed ink drops, and the optical sensor 116 generates scanned image data of the different reflectance levels of the ink on the surface of the object 150. The controller 128 then generates the higher precision entries in the LUT for the TRC based on the measured reflectance levels for the printed patches at different ink density levels. The process for generation of the floating point data for a TRC is otherwise known to the art and is not discussed in further detail herein.

The precision of the floating point entries in the higher precision color translation data 142 is higher than the inherent precision and corresponding color resolution of an 8-bit integer TRC because the floating point entries are often fractional values (e.g. 205.6) instead of the integer 8-bit values of a standard 8-bit TRC. However, during further processing in the printer 100, the controller 128 must convert input integer contone data to adjusted output integer contone data for additional halftone image data generation and printhead control operations. As described below, the controller 128 modifies the floating point entries in the LUT prior to generating a LUT with integer contone values.

Process 10 continues as the controller 128 generates a random floating point value in a predetermined range (block 16). In the printer 100, the controller 128 generates a random floating pint number in a range of 0.0, inclusive, to 1.0, exclusive, which is commonly referred to mathematically as a range of [0.0, 1.0). The controller 128 uses a hardware random number generator device, a software random number generator, or a pseudo-random number generator embodied as either hardware or software to generate the random number. While the controller 128 generates only one random value for the TRC in each plane, the generation of random numbers to modify each TRC enables more monotonic adjustments to the multiple TRCs in multiple planes, which is to say that the random values are distributed across the predetermined range randomly instead of being made in a predictable order.

In one embodiment, the random number generator produces random numbers with a uniform distribution in the predetermined range. The controller 128 generates random numbers with the uniform distribution for each plane in the plurality of planes during the printing process, and the generation of each random number is independent from the generation of any of the other random numbers for the other planes. In another embodiment, the controller 128 generates the random number for the first plane in the print job using the uniform random number generator. For subsequent planes in the print job, the controller 128 configures the random number generator to produce random numbers with a negative correlation to the random number that was used for the previous plane. For example, if the modified TRC for one plane is generated with a random value of "0.2" the controller 128 generates the random number for the modification of the TRC in the next plane with a negative correlation to the previous value of "0.2". The negative correlation reduces the likelihood of clustering where the controller 128 generates the same or very similar random values for two or more successive planes. Clustering is more likely to occur with a uniform random number generator since the uniform random number generator does not consider the random values that are generated for any of the other planes.

Figure 3:
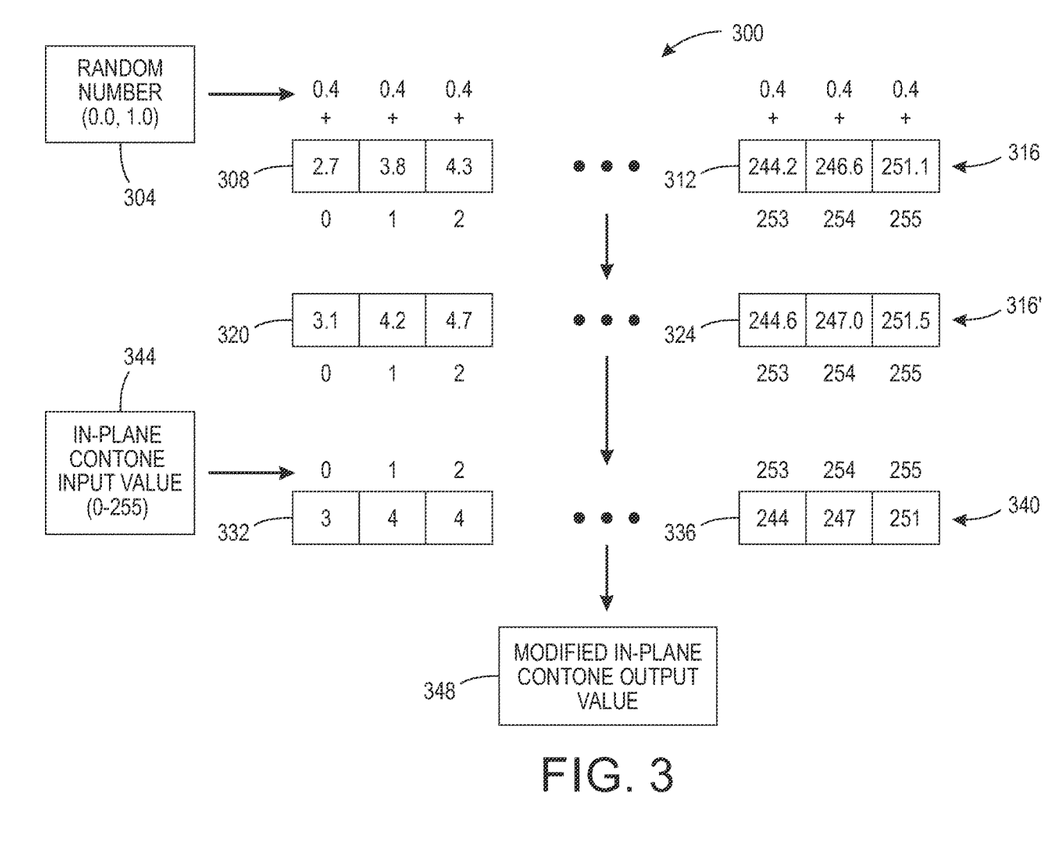
FIG. 3 is a diagram that depicts the modification of a lookup table (LUT) containing entries with higher precision values to produce entries in a TRC with lower precision values.

FIG. 3 includes a graphical illustration 300 of the addition process. In FIG. 3 the controller 128 generates a random number in the range [0.0, 1.0). In FIG. 3 the random number is 0.4, but those of skill in the art will recognize that the random number generator produces different random values during each execution of the process 10. FIG. 3 includes a LUT 316 with a plurality of higher-precision entries that are embodied as floating point values 312. The higher-precision LUT 316 includes a total of 256 entries (indexed 0-255) for each input value of an 8-bit input color depth component for one color separation in the printer 100. The higher-precision floating point values depict the output contone value for a given input contone value. For example, an input contone value of "2" maps to index 2 in the LUT 316, which corresponds to a floating point entry value of 4.3.

During process 10, the controller 128 adds the random floating point value to the floating point values in each of the plurality of higher-precision entries (block 20). In FIG. 3, the controller 128 adds the random number 0.4 to each entry it the LUT 316 to generate a modified floating point LUT 316' having floating point values that correspond to the sum of the random value and the original floating point value in each entry. As depicted in FIG. 3, the addition of the random floating point value to some of the entries in the first floating point LUT 312 produces a change in the integer component of the LUT entry. For example, the LUT entry 308 at index 0 in the LUT 316 has a value of "2.7" but the corresponding LUT entry 320 at index 0 in the LUT 316' has a value of "3.1". However, the addition of the random number to other entries in the LUT 316 does not produce a change in the integer component of the entry in the modified LUT 316'. For example, the LUT entry 312 at index 253 in the LUT 316 has an initial value of "244.2" and the corresponding LUT entry 324 at index 253 in the modified LUT 316' has a value of "244.6". While FIG. 3 depicts the modified LUT 316' for illustrative purposes, in some embodiments the controller 128 does not generate a modified high-precision LUT explicitly. Instead, the controller 128 adds the random value to each entry in the high-precision LUT and then applies the floor function that is described below to generate the entries in the lower-precision TRC for each plane directly.

Process 10 continues as the controller 128 generates entries in a modified lower-precision integer TRC for one plane from the modified higher-precision floating point entries using a numeric floor function (block 24). In one embodiment, the controller 128 applies the numeric floor function to convert each floating point entry in the higher-precision entries to a lower-precision integer value for use during a printing operation where the TRC is required to return an integer output value for each contone input value. In an embodiment that includes a higher-precision floating-point LUT, the floor function removes any fractional portion of the entry or "rounds down" the floating point values to generate an integer entry in the TRC that includes the integer component of the floating point value. The floor function effectively lowers the precision of the floating point entries to match the reduced precision of the integer entries in the final TRC. Because different random values are applied to the higher-precision entries in different planes, the overall value for the lower-precision TRC (e.g. an 8-bit TRC) approximates the higher-precision entries. For example, given a higher-precision floating point value of 128.3, the lower-precision integer TRC in some planes holds a value of 128, while in other planes the value is 129. The averaged value for the entry across multiple TRCs approximates the higher-precision value of 128.3 even though the individual planes only hold a value of 128 or 129.

In an integer embodiment, the entries in the higher-precision LUT include higher-precision integer values (e.g. 16 bit entries) and the controller applies the floor function to truncate the least-significant bits from the higher precision entry to generate the lower precision entry using only the N most significant bits of the high-precision entry to fill the lower precision entry. For example, the controller 128 truncates the 8 least significant bits from a 16 bit higher-precision entry to produce an 8 bit entry in the integer LUT for the modified TRC. The higher-precision entries include values in a range of 0 to 65,535 in a 16-bit precision LUT and the lower-precision entries include values of 0 to 255 in the 8-bit LUT. The greater number of entries in the higher-precision LUT corresponds to intermediate values that cannot be represented with complete accuracy in the lower precision LUT. The value "128" in the lower precision LUT corresponds to the value "32,768" in the higher-precision integer LUT and the value "129" corresponds to the value "33,024".

The lower-precision 8-bit TRC does not have sufficient precision to represent every value between 32,768 and 33,024 from the 16-bit LUT. Instead, the printer 100 adds the random number in the range of 0-255 to the entry in the higher-precision LUT, and in some instances the floor function returns 128 or 129 in the TRCs for different planes in the multi-plane printing process. The values of 128 or 129 average to approximate the higher-precision value more accurately than only using the value 128 or 129 in each plane. In the printer 100, the controller 128 stores the integer LUT for the TRC of each plane in the modified TRC data 144 in the memory 132. More generally, the controller 128 generates random values in a range corresponding to the number of distinct values in the higher-precision entries corresponding to a minimum interval between values in the lower-precision TRC, such as random numbers over an 8-bit range in the example above or random numbers that are selected over a 24-bit range in a configuration where the higher-precision entries have a bit depth of 32 bits and the lower precision entries have a bit depth of 8 bits.

FIG. 3 depicts the integer LUT 340 for a lower-precision TRC in one plane after the controller 128 applies the floor function to each entry of the modified floating point LUT 316'. As described above, some, but not all, of the entries in the modified floating point LUT 316' have an integer component that is different from the corresponding entry of the floating point LUT 316 due to the addition of the random value. The LUT 340 includes integer value entries that the controller 128 generates from the floating point entries in the modified LUT 316'. Thus, the controller 128 applies the floor function to the modified LUT 316' to generate the integer LUT 340 with a portion of entries in the LUT 340 including integer values that are different from the integer components in the floating point entries of the LUT 316. In the LUT 340, the entry 332 includes an integer value "3" that is different from the integer component of the corresponding entry 308 in the LUT 316, while the entry 336 in the LUT 340 includes the integer value "244" that remains unchanged from the integer component of the corresponding entry 312 in the LUT 316. The integer LUT 340 forms a TRC that the controller 128 uses during additional image processing in one plane during a printing operation.

During operation, the printer 100 performs the portions of the process 10 that are described above in conjunction with the processing of blocks 12-24 for one or more planes that are used in operation during a print job. In some embodiments, the modified lower-precision TRCs 144 are stored in the memory 132 at time of manufacture of the printer for the expected range of planes that the printer 100 employs during operation. In other embodiments the printer 100 generates the modified lower-precision TRCs 144 at the start of a print job. The random value modification of the entries in the TRC LUTs for multiple planes increases the effective color resolution of the printed image even though the individual TRC for each plane remains at the default precision level. The addition of a random value to each LUT entry in a plurality of planes during process 10 also enables the printer 100 to generate TRCs for multiple planes to increase the effective color resolutions in print jobs for which the printer 100 does not have a priori data that specify the number of planes used to print the image at the beginning of the print job.

Process 10 continues as the controller 128 uses the LUTs with integer entry values for one of the TRCs 144 to convert contone image data for one or more pixels in one plane from the device independent color space to the tone-corrected color space for the printer 100 in each plane during the print job (block 28). As depicted in FIG. 3, the controller 128 receives an input contone input datum 344 that has an integer value in the range corresponding to the index range of the modified TRC LUT 340 (e.g. 0 to 255). The controller 128 generates a modified in-plane output contone datum 348 from the corresponding value in the LUT 348 at the index specified by the input contone datum 344. The modified output contone datum 348 is an integer contone image data value that the controller 128 translates to the device specific color space of the printer 100 using the LUT in the corresponding TRC 144.

Process 10 continues as the printer 100 generates half-toned image data from the device dependent contone data that the controller 128 generates from the integer TRC LUT in each plane (block 32). The controller 128 subsequently uses the halftone image data to operate the inkjets in one or more of the printheads 108A-108C to form the printed image layer corresponding to each plane on the surface of the object 150 (block 36). Because the controller 128 uses the modified device-dependent contone image data as an input to the halftoning process, the printer 100 generates the multi-layer printed images with a visual color resolution that is effectively higher than the nominal color resolution (e.g. 8-bit resolution) of the individual TRCs during the print process. The controller 128 continues to perform the process 10 for each plane in a multi-layer print process to produce the printed image 152. The generation of halftoned image data and subsequent operation of the inkjets with reference to the halftone image data that occur after generation of the output contone image data from the TRCs are otherwise known to the art and are not described in further detail herein.

Figure 2:
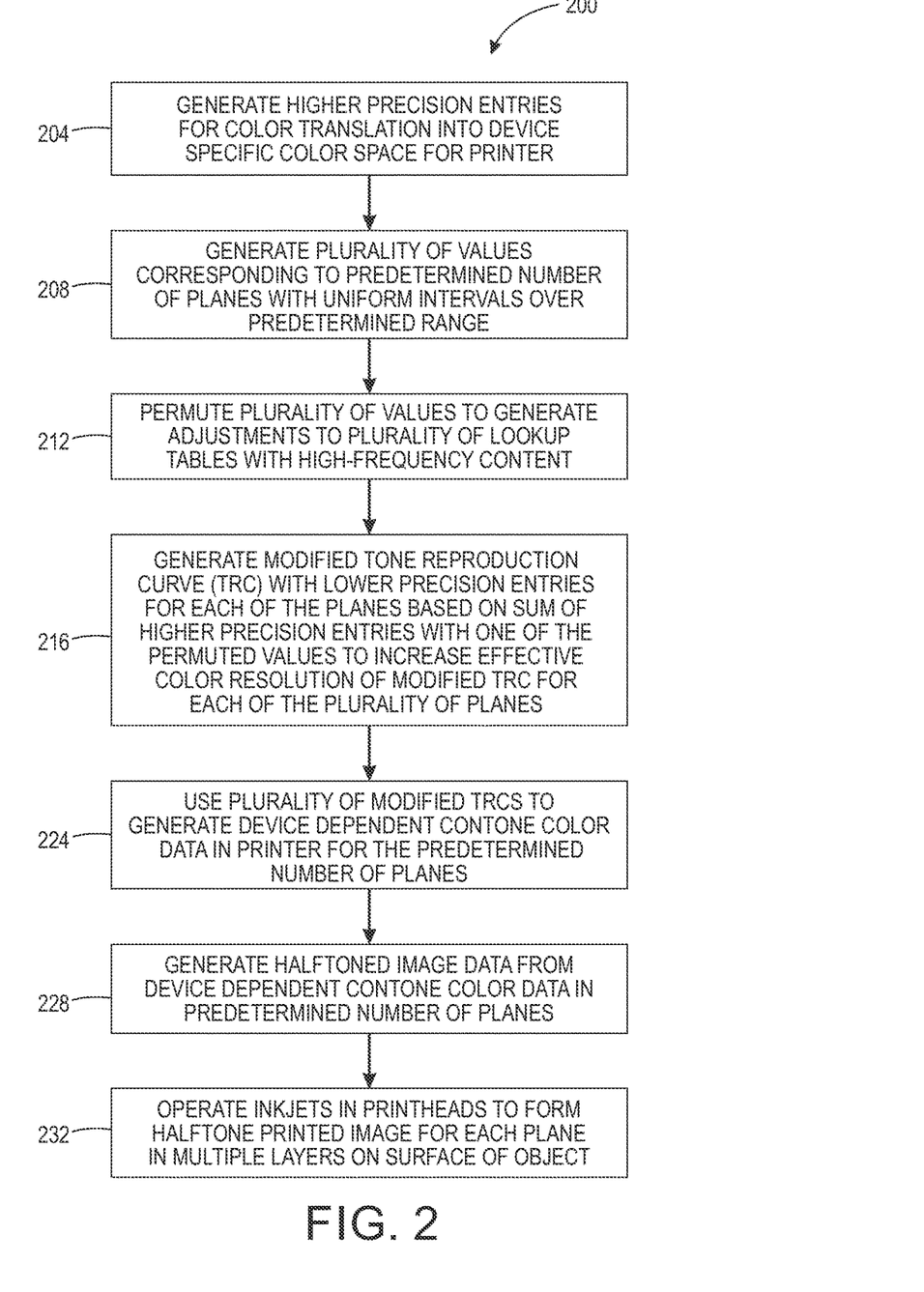
FIG. 2 is a block diagram of a process for generating a plurality of modified TRCs that are associated with a plurality of planes to increase the effective color resolution of a multi-layer printed image.

FIG. 2 depicts a process 200 for the operation of a printer, such as the printer 100 in FIG. 6 with an increased effective color resolution. The process 200 is directed to a multi-plane printing operation during a print job in which a controller has a prior data that specify the number of planes that are used to form the printed image. In the discussion below a reference to the process 200 performing a function or action refers to the operation of a digital controller that executes stored program instructions to perform the function or action in association with one or more components in a printer. The process 200 is described in conjunction with the printer 100 of FIG. 6 for illustrative purposes. The three-dimensional object printer 100 performs the process 200 after the controller 128 operates the printheads 104A-104C to eject drops of a build material to form at least a portion of the three-dimensional printed object 150 on the support member 102. The controller 128 receives three-dimensional object data 138 from the memory 132 and produces the object 150 with a size and shape specified in the three-dimensional object data 138.

Process 200 begins as the printer 100 generates a plurality of high-precision entries for color conversion to a device-dependent color space for the printer 100 (block 204). The printer 100 generates. For illustrative purposes, the process 200 is described in conjunction with a multi-layer print job that uses eight (8) planes and the high-precision entries are stored as floating-point values with a higher precision (e.g. 16 bit floats) than the precision of entries in the TRC for each plane (e.g. 8 bit integers). The total number of planes is also referred to with the variable P (e.g. P=8 in the example presented below). Alternative configurations of the process 200 employ different levels of precision for the higher precision entries and the TRC entries including different bit depths and the use of integer or floating point entries.

Figure 4:
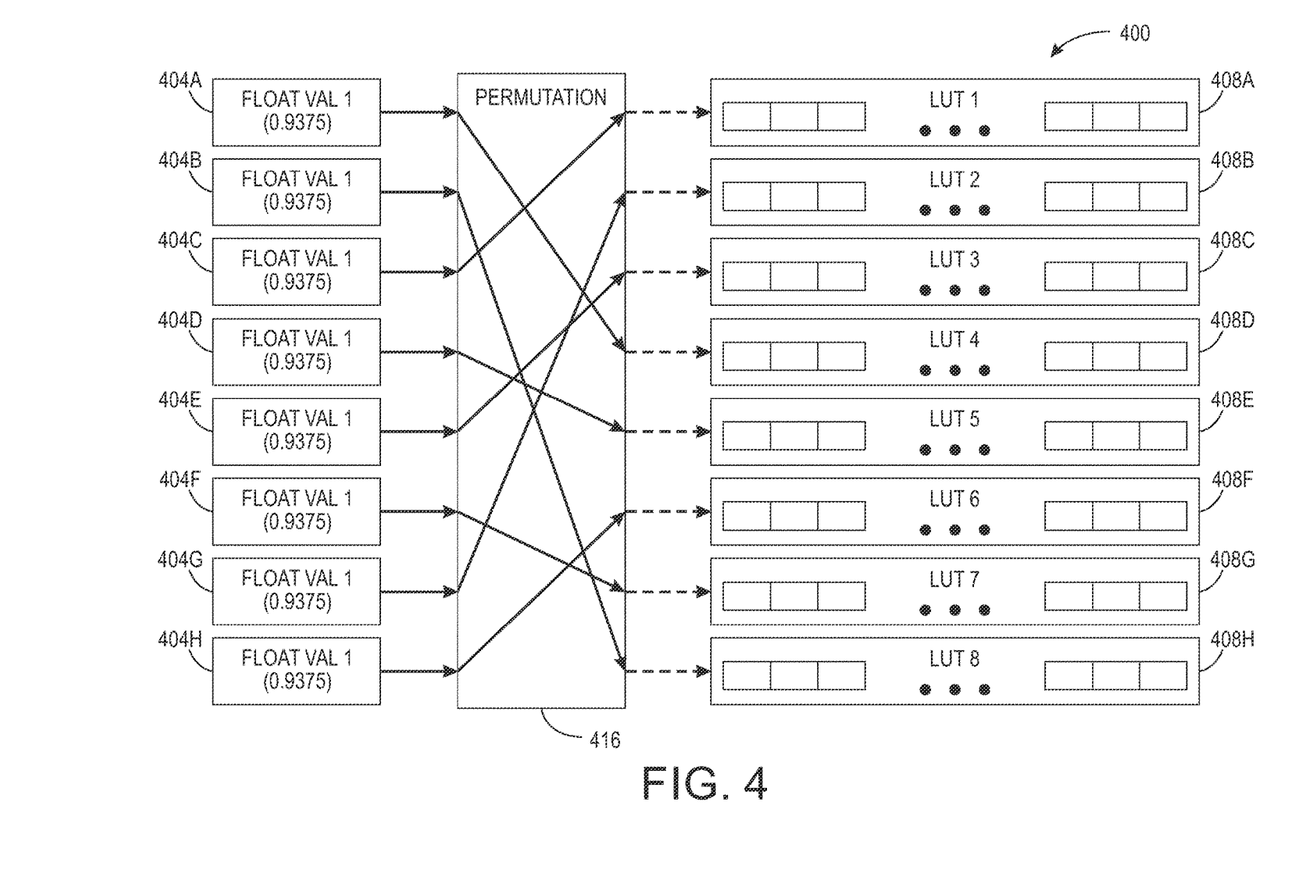
FIG. 4 is a diagram that depicts a plurality of generated floating point values that a controller permutes and applies the permuted floating point values to modify a LUT for one TRC corresponding to a plane in a multi-plane printing operation.

Process 200 continues as the controller 128 generates a plurality of floating point numbers within a predetermined numeric range, such as [0.0, 1.0), with uniform intervals between each of the floating point numbers within the predetermined number range (block 208). In one embodiment, the controller 128 generates each floating point number $F_m$ using the following equation:

$$F_m = \frac{2m-1}{2P},$$

where m is a number of one of the P planes (e.g. m=1 to 8). FIG. 4 depicts a diagram 400 that includes the floating point values 404A-404H that the controller 128 generates over a range of [0.0, 1.0) in a configuration of P=8. As depicted in FIG. 4, each pair of consecutive values in the generated floating point values 404A-404H is separated by a uniform interval, which is 0.125 in the example of FIG. 4.

Figure 5:
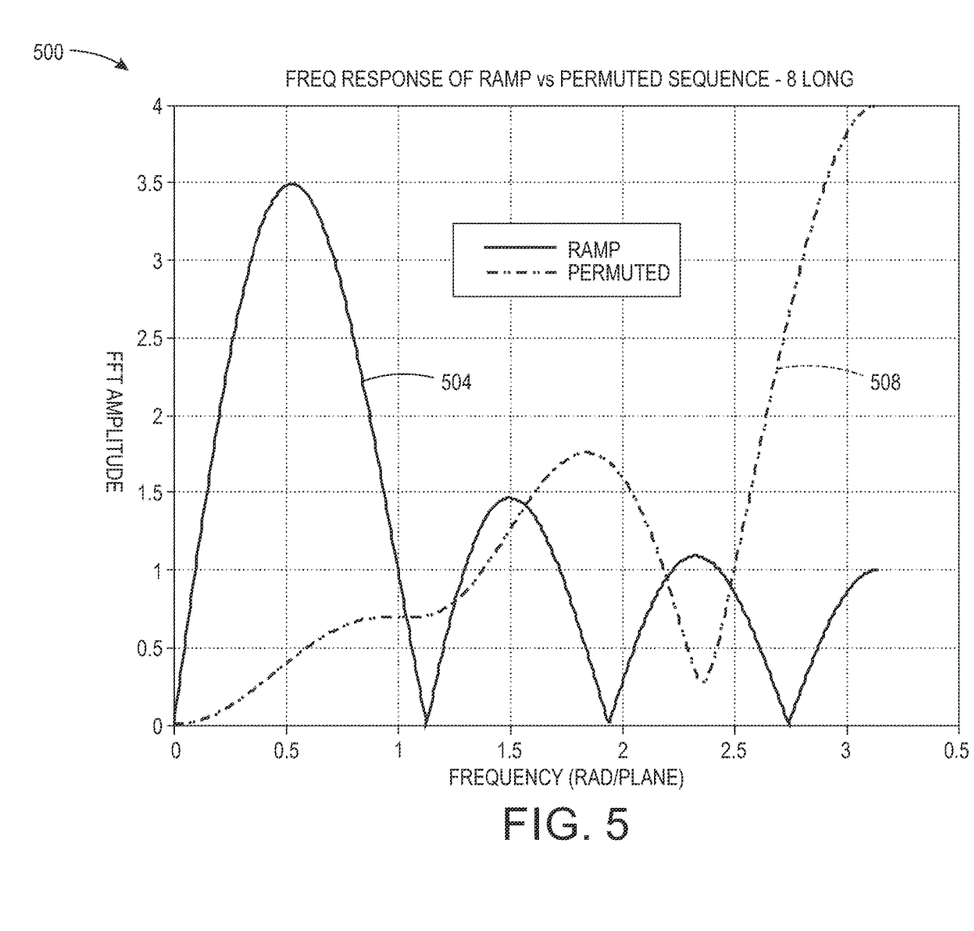
FIG. 5 is a graph depicted the frequency contents of components for LUT modification values in a first configuration where the values are applied in order and a second configuration where the values are applied in a permuted order.

Unlike the process 10, the controller 128 generates the floating point values in the process 200 at uniform and non-random intervals instead of generating the values as random numbers. As described below, the controller 128 adds floating point value to each of the entries in one LUT for one TRC corresponding to one of the P planes. However, if each floating point value is added to a plane in a direct manner, such as adding the values $F_m$ the corresponding planes m at indices m=1, 2, 3, etc., then the adjustments to the TRCs in the planes include a low frequency component that may produce an undesirable change in the final output of the printed image. FIG. 5 depicts a graph 500 including the low-frequency components 504 that are produced if the floating point values are added each LUT the planes P in-order.

During process 200, the controller 128 adds the generated floating point values to the LUTs in a permuted order to produce introduce a high frequency component into the modified TRCs for the plurality of planes. In the embodiment of FIG. 2, the controller 128 applies a permutation operation, such as a predetermined permutation matrix, to permute the generated floating point values (block 212). For example, in the embodiment of FIG. 4, the controller 128 permutes the floating point values 404A-404H with reference to a predetermined permutation matrix that is depicted graphically as permutation matrix 416. The permutation matrix 416 changes the floating point value 404A-404H that the controller 128 adds to each entry in one of the TRC LUTs 408A-408H. In the example of FIG. 4 the permutation process generates the following mapping for the initial value index to the output index, although different embodiments use different permutations: {1:4; 2:8; 3:1; 4:5; 5:3; 6:7; 7:2; 8:6}. The permutation introduces a high-frequency component for the generation of any image with at least three planes. The controller 128 applies the permutation to produce the high frequency content in the planes, which is depicted as the high frequency signal 508 in the graph 500 of FIG. 5. The permutation of the values produces the high frequency component that is much less visible in the final printed image compared to the low frequency component that is introduced if the controller 128 does not permute the floating point values.

Referring again to FIG. 2, process 200 continues as the controller 128 adds each of the floating point values to each entry in a corresponding LUT in the permuted order and applies a numeric floor function to produce the modified LUTs for the lower-precision TRCs in each of the P planes (block 216). The controller 128 performs the addition process and applies the floor function to generate the lower-precision TRCs in block 216 for each TRC in the plurality of TRCs in a similar manner to the processing described above with reference to blocks 20-24, respectively, in the process 10.

Process 200 continues as the controller 128 uses the plurality of integer TRCs to convert contone image data for one or more pixels in the plane from a device independent color space to a tone-corrected color space for use in the printer 100 (block 224). The controller 128 receives input contone image data for each plane in the predetermined plurality of planes and generates modified output contone image data in the device dependent color space for the printer based on the integer entries in the TRC LUT for each plane.

Process 200 continues as the printer 100 generates halftoned image data in the plurality of planes from the device dependent contone data that the controller 128 generates from the lower-precision TRC in each plane (block 228). The controller 128 subsequently uses the halftone image data to operate the inkjets in the printheads 108A-108C to form the multi-layer printed image on the surface of the object 150 (block 232). Because the controller 128 uses the modified device-dependent contone image data as an input to the halftoning process for each plane, the printer 100 forms multiple printed layers of the image that have an effective color resolution that is higher than the nominal color resolution provided by the default precision of the TRC for each plane (e.g. 8-bit precision). The generation of halftoned image data for each plane and subsequent operation of the inkjets with reference to the halftone image data for the multi-layer image that occur after generation of the output contone image data from the TRCs are otherwise known to the art and are not described in further detail herein.

While processes 10 and 200 are described above in conjunction with the three-dimensional object printer 100, similar processing techniques that generate TRCs with increased effective color resolutions are applicable to different printer embodiments that form printed images with multi-passes to form printed images from multiple layers of ink.

Figure 7:
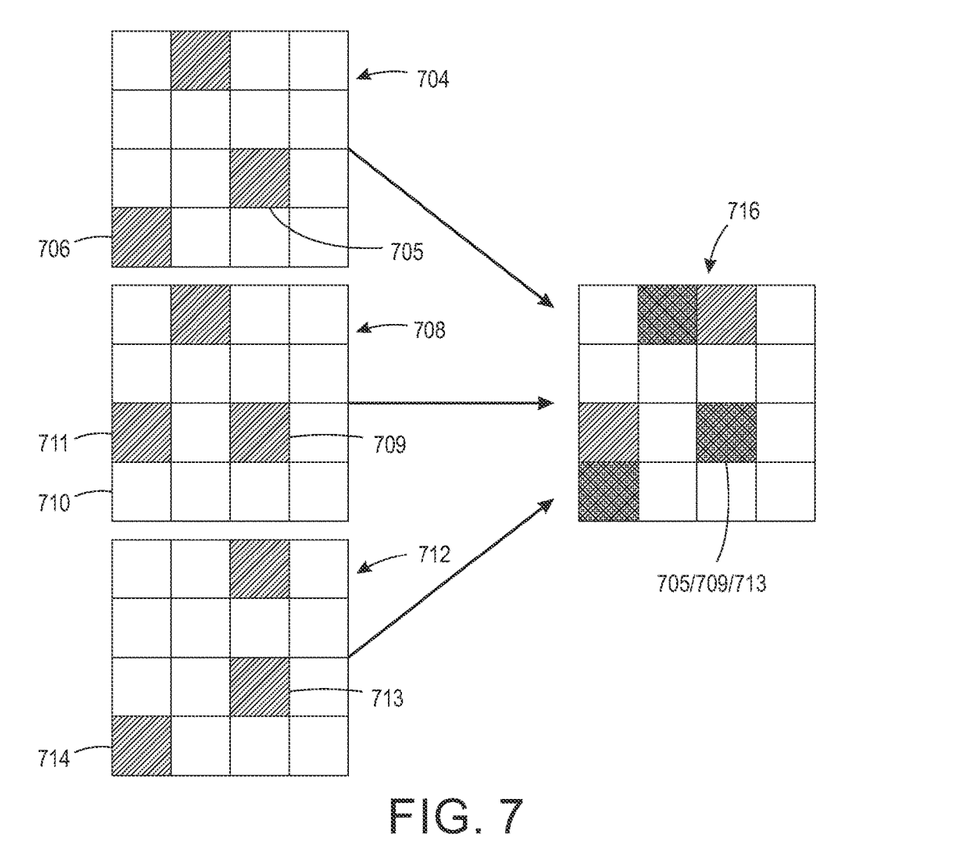
FIG. 7 is a depiction of three planes of halftone image data corresponding to a portion of a multi-layer printed image that the printer of FIG. 6 forms on a surface of a three-dimensional printed object.

FIG. 7 includes illustrative depictions of multiple planes of image data that the printer 100 forms using either of the processes 10 or 200 during a multi-layer printing operation. FIG. 7 depicts three planes 704, 708, and 712 for illustrative purposes, but different embodiments include at least two planes and often more than three planes. The planes 704-712 depict halftoned image data pixels where shaded pixels indicate locations on the image receiving surface where the printer ejects an ink drop and unshaded pixels indicate locations where the printer does not eject an ink drop. The printer 100 prints multiple layers of the image based on the image data from all three planes 704-712. In FIG. 7, the array 716 depicts the three planes 704-712 superimposed over one another in a similar manner to the multiple printed layers that the printer 100 forms in a superimposed manner to form the printed image. Since printer 100 generates modified TRCs for each plane, the corresponding contone and halftone image data for each plane often includes small differences that produce changes in the locations of printed ink drops. For example, in the planes 704 and 712 the pixel locations 706 and 714, respectively, are activated while in the plane 708 the same pixel location 710 is not activated while another pixel location 711 is activated. Some pixel locations are activated in multiple planes, such as the pixel locations 705, 709, and 713 in the planes 704, 708, and 712, respectively.

As depicted in FIG. 7, the processes 10 and 200 enable the printer 100 to produce printed image including ink drops that are located at different positions in different layers of the multi-layer printed image. The distribution of the ink drops over multiple layers produces printed images with a higher effective color resolution than would otherwise be produced using the lower inherent precision (e.g. 8-bit) of the TRCs in the printer 10. More particularly, the effective bit depth of the color resolution for the printed image increases over the inherent bit depth of the TRCs by a factor of $\log_2 (n)$ where n is the number of planes. For example, given an 8-bit native TRC precision and a total of four planes, the processes 10 and 200 enable the printer 100 to form printed images with an effective color resolution of 10 bits (8 bits+$\log_2$(4)bits=10 bits).

It will be appreciated that variants of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed:

1. A method of operating a three-dimensional object printer comprising:
    generating with a controller a first tone reproduction curve (TRC) having a first plurality of entries with a first precision, the first plurality of entries being generated with reference to a second plurality of entries having a second precision, the second plurality of entries being modified by a first value generated within a predetermined range prior to being used to generate the first plurality of entries, the second precision being greater than the first precision;
    generating with the controller a second TRC having a third plurality of entries with the first precision, the third plurality of entries being generated with reference to the second plurality of entries being modified by a second value generated within the predetermined range prior to being used to generate the third plurality of entries, the second value being different than the first value;
    receiving with the controller input contone image data corresponding to an image to be printed by the printer;
    generating with the controller first contone image data for a first plane of a multi-layer printed image with reference to the input contone image data and the first TRC;
    generating with the controller first halftone image data with reference to the first contone image data and a predetermined halftone process;
    operating with the controller a plurality of inkjets to form a first layer of the multi-layer printed image on a surface of a three-dimensional printed object with reference to the first halftone image data;
    generating with the controller second contone image data for a second plane of the three-dimensional printed image with reference to the input contone image data and the second TRC;
    generating with the controller second halftone image data with reference to the second contone image data and the predetermined halftone process, the second halftone image data being different than the first halftone image data; and
    operating with the controller the plurality of inkjets to form a second layer of the multi-layer printed image on the first layer with reference to the second halftone image data.

2. The method of claim 1, the generation of the first TRC further comprising:
    generating with the controller the first value in the predetermined range at random; and
    generating with the controller each entry in the first plurality of entries with reference to a floor function applied to a sum of a corresponding entry in the second plurality of entries with the first value, the sum having the second precision and an output of the floor function producing a value with the first precision for each entry in the first TRC.

3. The method of claim 2, the generation of the second TRC further comprising:
    generating with the controller the second value in the predetermined range at random; and
    generating with the controller each entry in the second plurality of entries with reference to the floor function applied to a sum of a corresponding entry in the second plurality of entries with the second value, the sum having the second precision and an output of the floor function producing a value with the first precision for each entry in the second TRC.

4. The method of claim 3, the generation of the first value and the second value further comprising:
    generating with the controller the first value with a random number generator that produces random values with a uniform distribution over the predetermined range; and
    generating with the controller the second value with the random number generator that produces random values with the uniform distribution over the predetermined range.

5. The method of claim 3 further comprising:
    generating with the controller the first value with a first random number generator that produces random values with a uniform distribution over the predetermined range; and
    generating with the controller the second value with a second random number generator that produces random values within the predetermined range with a negative correlation to the first value.

6. The method of claim 1, the generation of the first contone image data further comprising:
    identifying with the controller a first integer value of a first datum in the input contone image data;
    identifying with the controller a second integer value in one of the first plurality of entries in the first TRC at an index in the first TRC corresponding to the first integer value; and
    generating with the controller the first contone image data including the second integer value in a device dependent color space for the printer.

7. The method of claim 1 further comprising:
    generating with the controller a plurality of values in the predetermined range at uniform intervals within the predetermined range and a number of the plurality of values being equal to a number of a predetermined plurality of planes used to form the three-dimensional printed image, the number of the predetermined plurality of planes being at least three;
    identifying with the controller the first value, the second value, and a third value from the plurality of values with reference to a predetermined permutation;

generating with the controller a third TRC having a fourth plurality of entries with the first precision with reference to the second plurality of entries stored in the memory modified by the third value, the third value being different than the first value and the second value, and the first TRC, the second TRC, and the third TRC including a high frequency signal component;

generating with the controller third contone image data for a third plane of the three-dimensional printed image with reference to the input contone image data and the third TRC;

generating with the controller third halftone image data with reference to the third contone image data and the predetermined halftone process, the third halftone image data being different than the first halftone image data and the second halftone image data; and operating with the controller the plurality of inkjets to form a third layer of the multi-layer printed image on the second layer with reference to the third halftone image data.

8. The method of claim 1, the generation of the first TRC further comprising:

generating with the controller the first value as a floating point value in a range of 0.0, inclusive, to 1.0, exclusive;

generating with the controller a floating point sum of the first value and another floating point value stored in one entry of the second plurality of entries; and generating with the controller an integer value for one entry in the first TRC with reference to a floor function of the floating point sum that produces an integer component of the sum.

9. The method of claim 1, the generation of the first TRC further comprising:

generating with the controller the first value as an integer value in a range corresponding to a first number of bits of precision for the first precision of the first plurality of entries in the TRC;

generating with the controller an integer sum of the first value and another integer value stored in one entry of the second plurality of entries, the integer sum being stored with a second number of bits of precision corresponding to the second precision of the second plurality of entries; and generating with the controller an integer value for one entry in the first TRC with reference to a floor function of the integer sum that produces the integer value including only the first number of most-significant bits from the integer sum.

10. The method of claim 9 wherein the controller generates the one entry in the first plurality of entries in the first TRC with the first precision of eight bits and the controller generates the integer sum with the second precision of sixteen bits.

11. A three-dimensional object printer comprising:

a plurality of inkjets configured to eject ink onto a surface of a three-dimensional printed object in a print zone;

a memory; and a controller operatively connected to the plurality of inkjets and the memory, the controller being configured to:

generate a first tone reproduction curve (TRC) having a first plurality of entries with a first precision, the first plurality of entries being generated with reference to a second plurality of entries having a second precision stored in the memory, the controller modifying the second plurality of entries by a first value generated within a predetermined range prior to being used to generate the first plurality of entries, the second precision being greater than the first precision;

generate a second TRC having a third plurality of entries with the first precision, the third plurality of entries being generated with reference to the second plurality of entries, the controller modifying the second plurality of entries by a second value generated within the predetermined range prior to being used to generate the third plurality of entries, the second value being different than the first value;

receive input contone image data corresponding to an image to be printed by the printer;

generate first contone image data for a first plane of a multi-layer printed image with reference to the input contone image data and the first TRC;

generate first halftone image data with reference to the first contone image data and a predetermined halftone process;

operate the plurality of inkjets to form a first layer of the multi-layer printed image on the surface of the three-dimensional printed object with reference to the first halftone image data;

generate second contone image data for a second plane of the three-dimensional printed image with reference to the input contone image data and the second TRC;

generate second halftone image data with reference to the second contone image data and the predetermined halftone process, the second halftone image data being different than the first halftone image data; and operate the plurality of inkjets to form a second layer of the multi-layer printed image on the first layer with reference to the second halftone image data.

12. The three-dimensional object printer of claim 11, the controller being further configured to:

generate the first value in the predetermined range at random; and generate each entry in the first plurality of entries with reference to a floor function applied to a sum of a corresponding entry in the second plurality of entries with the first value, the sum having the second precision and an output of the floor function producing a value with the first precision for each entry in the first TRC.

13. The three-dimensional object printer of claim 12, the controller being further configured to:

generate the second value in the predetermined range at random; and generate each entry in the second plurality of entries with reference to the floor function applied to a sum of a corresponding entry in the second plurality of entries with the second value, the sum having the second precision and an output of the floor function producing a value with the first precision for each entry in the second TRC.

14. The three-dimensional object printer of claim 13, the controller being further configured to:

generate the first value with a random number generator that produces random values with a uniform distribution over the predetermined range; and generate the second value with the random number generator that produces random values with the uniform distribution over the predetermined range.

15. The three-dimensional object printer of claim 13, the controller being further configured to:

generate the first value with a first random number generator that produces random values with a uniform distribution over the predetermined range; and generate the second value with a second random number generator that produces random values within the predetermined range with a negative correlation to the first value.

16. The three-dimensional object printer of claim 11, the controller being further configured to:

identify a first integer value of a first datum in the input contone image data;

identify a second integer value in one of the first plurality of entries in the first TRC at an index in the first TRC corresponding to the first integer value; and generate the first contone image data including the second integer value in a device dependent color space for the printer.

17. The three-dimensional object printer of claim 11, the controller being further configured to:

generate a plurality of values in the predetermined range at uniform intervals within the predetermined range and a number of the plurality of values being equal to a number of a predetermined plurality of planes used to form the three-dimensional printed image, the number of the predetermined plurality of planes being at least three;

identify the first value, the second value, and a third value from the plurality of values with reference to a predetermined permutation;

generate a third TRC having a fourth plurality of entries with the first precision with reference to the second plurality of entries stored in the memory modified by the third value, the third value being different than the first value and the second value, and the first TRC, the second TRC, and the third TRC including a high frequency signal component;

generate third contone image data for a third plane of the three-dimensional printed image with reference to the input contone image data and the third TRC;

generate third halftone image data with reference to the third contone image data and the predetermined halftone process, the third halftone image data being different than the first halftone image data and the second halftone image data; and operate the plurality of inkjets to form a third layer of the multi-layer printed image on the second layer with reference to the third halftone image data.

18. The three-dimensional object printer of claim 11, the controller being further configured to:

generate the first value as a floating point value in a range of 0.0, inclusive, to 1.0, exclusive;

generate a floating point sum of the first value and another floating point value stored in one entry of the second plurality of entries; and generate with the controller an integer value for one entry in the first TRC with reference to a floor function of the floating point sum that produces an integer component of the sum.

19. The three-dimensional object printer of claim 11, the controller being further configured to:

generate the first value as an integer value in a range corresponding to a first number of bits of precision for the first precision of the first plurality of entries in the TRC;

generate an integer sum of the first value and another integer value stored in one entry of the second plurality of entries, the integer sum being stored with a second number of bits of precision corresponding to the second precision of the second plurality of entries; and generate an integer value for one entry in the first TRC with reference to a floor function of the integer sum that produces the integer value including only the first number of most-significant bits from the integer sum.

20. The three-dimensional object printer of claim 19, the controller being further configured to:

generate the one entry in the first plurality of entries in the first TRC with the first precision of eight bits and generate the integer sum with the second precision of sixteen bits.

* * * * *